US009167124B2

(12) United States Patent
Dwivedula et al.

(10) Patent No.: US 9,167,124 B2
(45) Date of Patent: Oct. 20, 2015

(54) PORTABLE DOCUMENT SCANNER HAVING USER INTERFACE AND INTEGRATED COMMUNICATION MEANS

(71) Applicant: The Neat Company, Inc., Philadelphia, PA (US)

(72) Inventors: Ravi Shankar Venkata Dwivedula, Bensalem, PA (US); Richard B. Carragher, Jr., Burlington, NJ (US); Harris Romanoff, Bala Cynwyd, PA (US)

(73) Assignee: The Neat Company, Inc., Philadelphia, PA (US)

( * ) Notice: Subject to any disclaimer, the term of this patent is extended or adjusted under 35 U.S.C. 154(b) by 0 days.

(21) Appl. No.: 13/952,264

(22) Filed: Jul. 26, 2013

(65) Prior Publication Data

US 2014/0029067 A1 Jan. 30, 2014

Related U.S. Application Data

(60) Provisional application No. 61/676,582, filed on Jul. 27, 2012.

(51) Int. Cl.
*H04N 1/04* (2006.01)
*H04N 1/00* (2006.01)
*H04N 1/107* (2006.01)
*H04N 1/32* (2006.01)

(52) U.S. Cl.
CPC ............... *H04N 1/04* (2013.01); *H04N 1/0036* (2013.01); *H04N 1/00225* (2013.01); *H04N 1/00363* (2013.01); *H04N 1/00366* (2013.01); *H04N 1/107* (2013.01); *H04N 1/32042* (2013.01); *H04N 2201/0039* (2013.01); *H04N 2201/0055* (2013.01)

(58) Field of Classification Search
USPC ................ 358/474, 2.1, 1.18, 1.15, 500, 401; 235/494
See application file for complete search history.

(56) References Cited

U.S. PATENT DOCUMENTS

| 5,844,226 | A | 12/1998 | Suzuki |
| 6,539,060 | B1 | 3/2003 | Lee et al. |
| 6,685,095 | B2 * | 2/2004 | Roustaei et al. ......... 235/472.01 |

(Continued)

FOREIGN PATENT DOCUMENTS

WO   WO 2011/058461   5/2011

*Primary Examiner* — Jerome Grant, II
(74) *Attorney, Agent, or Firm* — Baker & Hostetler LLP

(57) ABSTRACT

A portable document scanner (PDS) is provided that need not be in communication with a local computer. The PDS includes an image scanner for scanning an input document to generate a scan image, a processor, a wireless communications port that enables wireless communications with remote computing services, and a memory that stores instructions for execution by the processor to locally process the scan image. Such processing includes, for example, extracting identity, position, and/or orientation of one or more optical semaphores from the scan image, where the extracted semaphores include (1) optical characters including letters, numerals, and/or punctuation, (2) informational indicia including bar codes, data graphs, pictures, and/or icons, and (3) document formatting indicators including lines, bars, arrows, and/or grids. The extracted semaphore data is communicated to a remote computing service via the wireless communications port. The processing operations may be managed by the user through an integrated display interface.

15 Claims, 4 Drawing Sheets

(56) References Cited

U.S. PATENT DOCUMENTS

| | | |
|---|---|---|
| 7,069,240 B2 | 6/2006 | Spero |
| 8,155,442 B2 | 4/2012 | Ma |
| 8,218,890 B2 | 7/2012 | Turkelson |
| 8,794,537 B2 * | 8/2014 | Guenter et al. ............... 235/494 |
| 2002/0041712 A1 * | 4/2002 | Roustaei et al. .............. 382/199 |
| 2003/0021083 A1 * | 1/2003 | Landry et al. ................. 361/683 |
| 2004/0127208 A1 | 7/2004 | Nair et al. |
| 2007/0119955 A1 * | 5/2007 | Barenburg et al. ............ 235/494 |
| 2009/0016606 A1 | 1/2009 | Meyer et al. |
| 2009/0033988 A1 * | 2/2009 | Lapstun et al. ............... 358/1.15 |
| 2009/0034000 A1 * | 2/2009 | Lapstun et al. ............... 358/1.18 |
| 2009/0067729 A1 | 3/2009 | Turkelson et al. |
| 2009/0159683 A1 * | 6/2009 | Roquemore et al. ...... 235/462.11 |
| 2009/0166424 A1 * | 7/2009 | Gerst et al. .................. 235/462.2 |
| 2010/0171763 A1 | 7/2010 | Bhatt et al. |
| 2012/0075442 A1 | 3/2012 | Vujic |
| 2014/0061320 A1 * | 3/2014 | Guenter et al. ............... 235/494 |

* cited by examiner

PORTABLE DOCUMENT SCANNER HAVING USER INTERFACE AND INTEGRATED COMMUNICATION MEANS

CROSS REFERENCE TO RELATED APPLICATIONS

This application claims priority benefit to U.S. Provisional Patent Application No. 61/676,582 filed Jul. 27, 2012. The contents of that patent application are hereby incorporated by reference.

TECHNICAL FIELD

The invention relates to scanning paper documents into digital formats generally, and to systems and methods for locally processing documents in a portable scanner and transmitting them to a remote computing service specifically.

BACKGROUND

Portable document scanners for capturing images of documents such as receipts and forwarding such images to a computer processor for processing are known in the art. For example, U.S. Pat. No. 7,069,240 assigned to the present assignee discloses a system including an image capture device, such as a portable scanner or digital camera, that is connected to a computer processor that captures and stores the images, analyzes the images, converts the images to text, analyzes the data, and, in the event of expense data, puts the data into an expense report. The images may be uploaded via the Internet or an intranet to another network such as the cloud for remote data storage. Such a system has been shown to profoundly improve the processing of receipts and to expedite the generation of expense reports and the like.

In the case of remote storage of the scanned data, as in the cloud, for example, it is desired to provide some processing of the scanned data locally at the portable scanner in order to minimize the communication delays inherent in remote communications. For example, it is desired to process the image content locally to facilitate the classification and storage of the imaged data either locally or remotely. The present invention addresses these and other needs in the art.

SUMMARY

The system and related methods described herein addresses the above and other needs in the art by providing a powered, portable, digital image capture device such as a battery-powered document scanner having an onboard computer, an integrated user interface, and integrated means for transmitting image capture data and related data to a remote computer system without requiring the user of the system to employ a separate computing device to transfer the image capture data and related data between the image capture device and remote computer system for storage (e.g., storage in the cloud). The portable document scanner includes a processor that executes software instructions for locally performing operations upon the scanned image data, such as, but not limited to, automated cropping, scaling, rotating to deskew, background enhancement, image format conversion, despeckling, and modifying a histogram of the scan image. The portable document scanner further provides localized processing at the scanner for purposes of extracting identity, position, and/or orientation of one or more optical semaphores from the image. In exemplary embodiments, such semaphores include optical characters such as letters, numerals, and punctuation; informational indicia such as bar codes, data graphs, pictures, and icons; and document formatting indicators such as lines, bars, arrows, and grids. The processing at the portable document scanner also may initiate a local business process based on one or more of the extracted semaphores or other useful extracted information. A user interface on the portable document scanner facilitates user interaction with the scanner software during the performance of the data processing and business processes.

During operation, a user of the system and method inputs one or more documents into a digital image capture device, such as a scanner, which performs the aforementioned operations and/or other available operations upon the image data as instructed by embedded software, firmware, or at the direction of the user through interaction with the digital image capture device via the integrated user interface. The system employs integrated transmitting means of the digital image capture device to transmit data representing and relating to the scanned image to a remote computer service, such as the cloud, without requiring the user to employ an intermediary computing device. The operation of the system may be affected by configuration of configurable system parameters, such as, but not limited to, transmission settings, user-related settings and image data operation settings, all of which may be modified by the user through the integrated user interface or by the embedded software or firmware if programmed to do so.

An exemplary embodiment of a portable document scanner in accordance with the invention includes an image scanner for scanning an input document to generate a scan image, a processor, a wireless communications port that enables wireless communications with remote computing services, and a memory that stores instructions for execution by the processor. The instructions relate to different software processing including processes for extracting the identity, position, and/or orientation of one or more optical semaphores from the scan image, where the extracted semaphores include (1) optical characters including letters, numerals, and/or punctuation, (2) informational indicia including bar codes, data graphs, pictures, and/or icons, and (3) document formatting indicators including lines, bars, arrows, and/or grids. The instructions for communicating semaphore data to a remote computing service via the wireless communications port. A user interface is also disposed on a housing of the portable document scanner and is adapted to permit a user to select and to interact with software processes being executed by the processor.

Other exemplary software processes executed by the processor of the portable document scanner include software for performing image processing operations on the scan image, the image processing operations including auto cropping, scaling, rotating to deskew, background enhancement, image format conversion, despeckling, and/or modifying a histogram of the scan image under user control via the user interface. The user interface also enables the user to provide pre-scan settings including selection of pixel density; how color is digitized, image storage or export formats, and/or storage or export features.

The software processes also may include software that enables the user to initiate a business process to be performed by the processor based upon one or more of the extracted semaphore data. The status of the business process is then communicated to the user via the user interface. Other software processes determine document image quality and communicate the document image quality to the user via the user interface, while other software processes process the scan image to automatically append to the semaphore data further data including geolocation information related to the scan image.

Yet other software processes implemented by the processor detect the availability and connectivity state of the wireless communications port and cause the processor to perform image processing of the scan image when the wireless communications port is determined by the processor to be unavailable or disconnected.

The invention also encompasses methods of scanning a document with such a portable document scanner by performing the steps of:

scanning the document with an image scanner to generate a scan image;

processing the scan image, using a processor, to extract identity, position, and/or orientation of one or more optical semaphores from the scan image, where the extracted semaphores include (1) optical characters including letters, numerals, and/or punctuation, (2) informational indicia including bar codes, data graphs, pictures, and/or icons, and (3) document formatting indicators including lines, bars, arrows, and/or grids; and communicating the semaphore data to a remote computing service via a wireless communications port of the portable document scanner.

The inventive methods also include enabling a user to select and to interact with software processes being executed by the processor via a user interface disposed on a housing of the portable document scanner. The user may also select, via the user interface, image processing operations to be performed on the scan image, such image processing operations including auto cropping, scaling, rotating to deskew, background enhancement, image format conversion, despeckling, and/or modifying a histogram of the scan image. The user may further select, via the user interface, pre-scan settings including selection of pixel density; how color is digitized, image storage or export formats, and/or storage or export features.

The inventive methods further include implementation of the afore-mentioned processing steps by software loaded on the processor of the portable document scanner. For example, such methods include initiating a business process based upon one or more of the extracted semaphore data, and communicating a status of the business process to the user via the user interface; determining document image quality, and communicating the document image quality to the user via the user interface; processing the scan image to automatically append to the semaphore data further data including geolocation information related to the scan image; detecting the availability and connectivity state of a wireless communications port of the portable document scanner; and performing image processing of the scan image when the wireless communications port is determined to be unavailable or disconnected.

A person of skill in the art will recognize the distinct advantage of such a stand-alone, fully independent digital image capture device having transmission capabilities to convey acquired and processed image data, without the employ of an intermediary computing device, to a remote computing service.

BRIEF DESCRIPTION OF THE DRAWINGS

The above-mentioned and other features and advantages of the invention will be become apparent from the following description in conjunction with the attached figures, of which.

DETAILED DESCRIPTION OF ILLUSTRATIVE EMBODIMENTS

Exemplary embodiments of the invention will be described in detail below with reference to FIGS. 1-4. Those skilled in the art will appreciate that the description given herein with respect to those figures is for exemplary purposes only and is not intended in any way to limit the scope of the invention. All questions regarding the scope of the invention may be resolved by referring to the appended claims.

Figure 1:
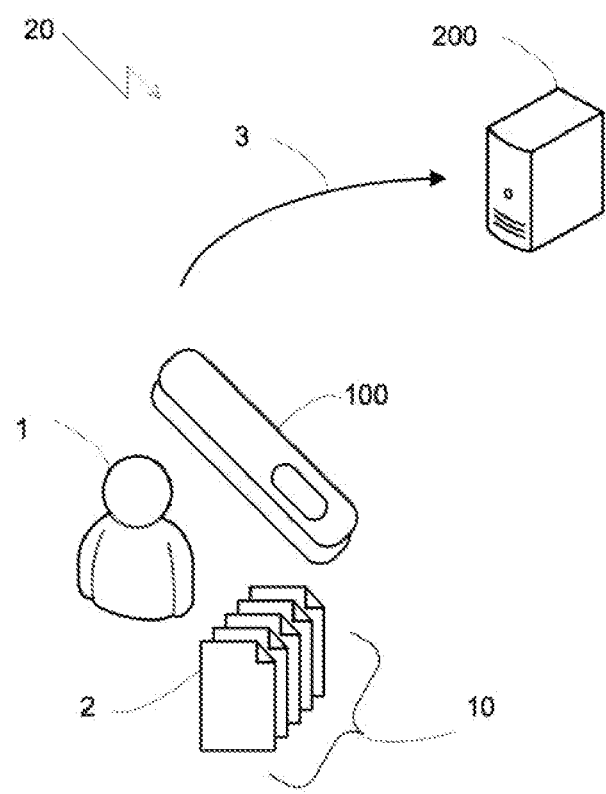
FIG. 1 is a conceptual representation of communications in a portable document scanner system.
Figure 2:
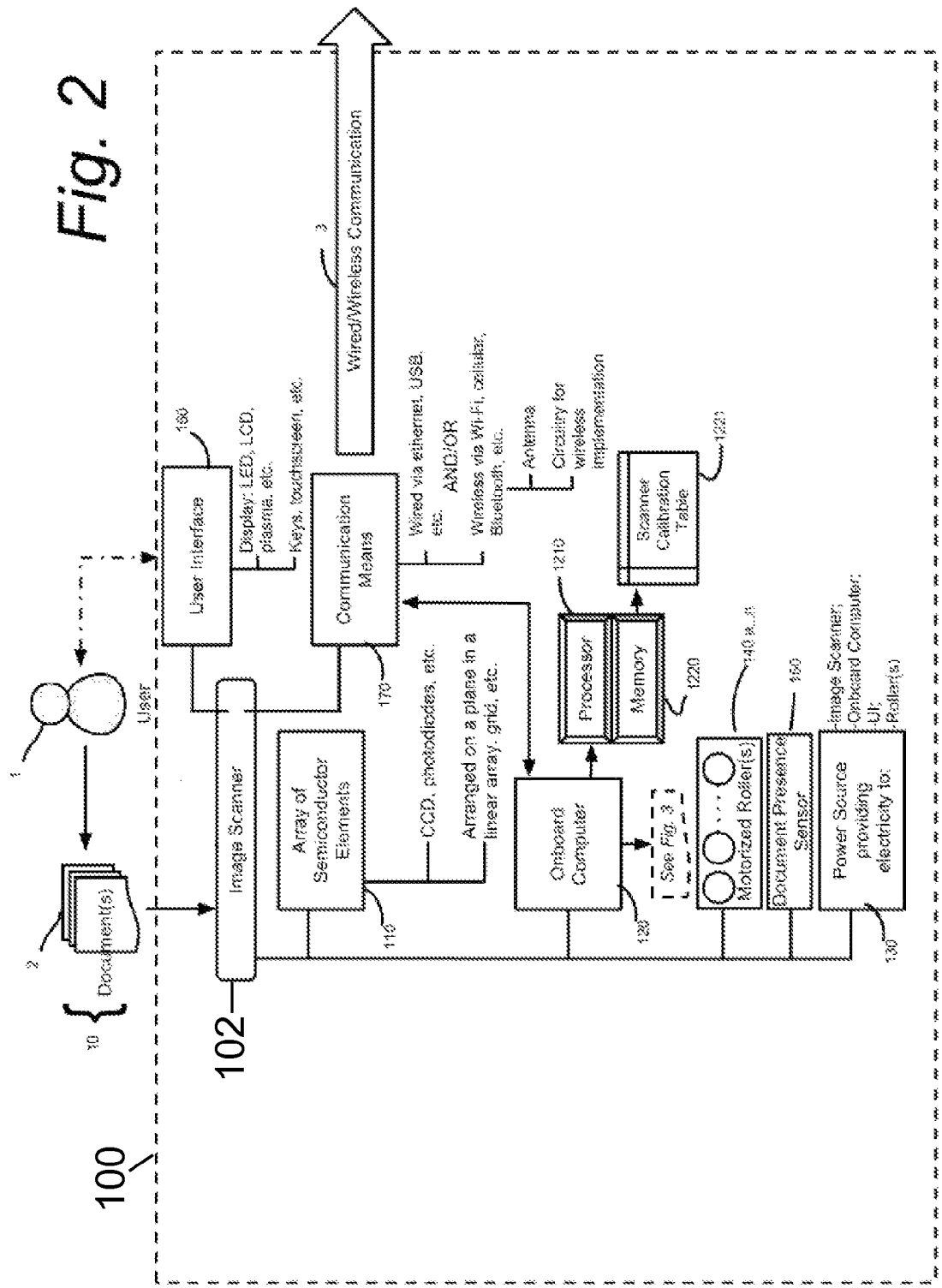
FIG. 2 is a schematic representation of a portable document scanner in an example embodiment.

FIG. 1 depicts a system 20 in which in which a user 1 uses a portable document scanner (PDS) 100 to scan a page 2 belonging to a collection of pages 10. The collection of pages 10 may be a single document or a collection of documents, each document having one or more pages. As illustrated in FIG. 2, the PDS 100 includes a port 170 by which it may transmit data to a remote computing service (RCS) 200 via communications link 3. In the exemplary embodiment of the invention, communications link 3 is operable, in conjunction with those elements further described in relation to FIGS. 2 and 3, to achieve the transmission to the RCS 200 without requiring the user 1 to employ an intermediary personal computing device.

FIG. 2 depicts certain features of PDS 100. As shown, the PDS 100 comprises a document presence sensor 150 suitable for detecting the presence of a page 2 and causing the motorized roller or rollers 140 to advance the page 2 or pages 10 relative to the optical scanning mechanisms of the PDS 100. The optical scanning mechanisms include an image scanner 102 having an array of semiconductor elements 110, which may be charge-couple devices (CCDs), photodiodes, or other of various available semiconductor elements known in the art. The semiconductor elements 110 are arranged on a plane either in a linear array, grid, or other known arrangement. The onboard computer 120 of PDS 100 includes at least one processor 1210 and digital memory 1220. The PDS 100 further includes a power source 130, which may be internal or external, and provides power to other elements of the PDS 100, including the image scanner 102, document presence sensor 150, motorized roller(s) 140, user interface 160, and other components, if needed. In the exemplary embodiment, the power source 130 is a rechargeable battery housed with the image scanner and all of the other components of FIG. 2 in a housing of the PDS 100. The power source 130 also may have an external port for connecting to an AC power source and for charging the rechargeable battery.

FIG. 2 further depicts the integral user interface 160, which is disposed on the housing of the PDS 100 and adapted to permit user 1 to select and interact with software processes being executed by the onboard computer 120 to configure the PDS 100 and to invoke its functionality. In the example embodiment, the user interface 160 is a plasma, LCD, or LED touch-screen or other similar display, varieties of which will be known to one skilled in the art. The interface 160 provides means for permitting the user to interact with the PDS 100, such as a "QWERTY" keyboard, an on-screen touch-screen keyboard, or other on-screen inputs. Through the use of the user interface 160, the user 1 operates the scanner's functionality, including that which is further described in relation to FIG. 3 below.

Further still, FIG. 2 depicts the integrated communication means 170 of the PDS 100. The communication means 170 includes wired and/or wireless connectivity mechanisms employing known technologies such as wired, Ethernet communications, USB, wireless Wi-Fi communications, cellular communications, Bluetooth, and the like. These mechanisms permit the PDS 100 to accomplish wired or wireless communication 3 of image data and useful image-related data to the RCS 200.

Figure 3:
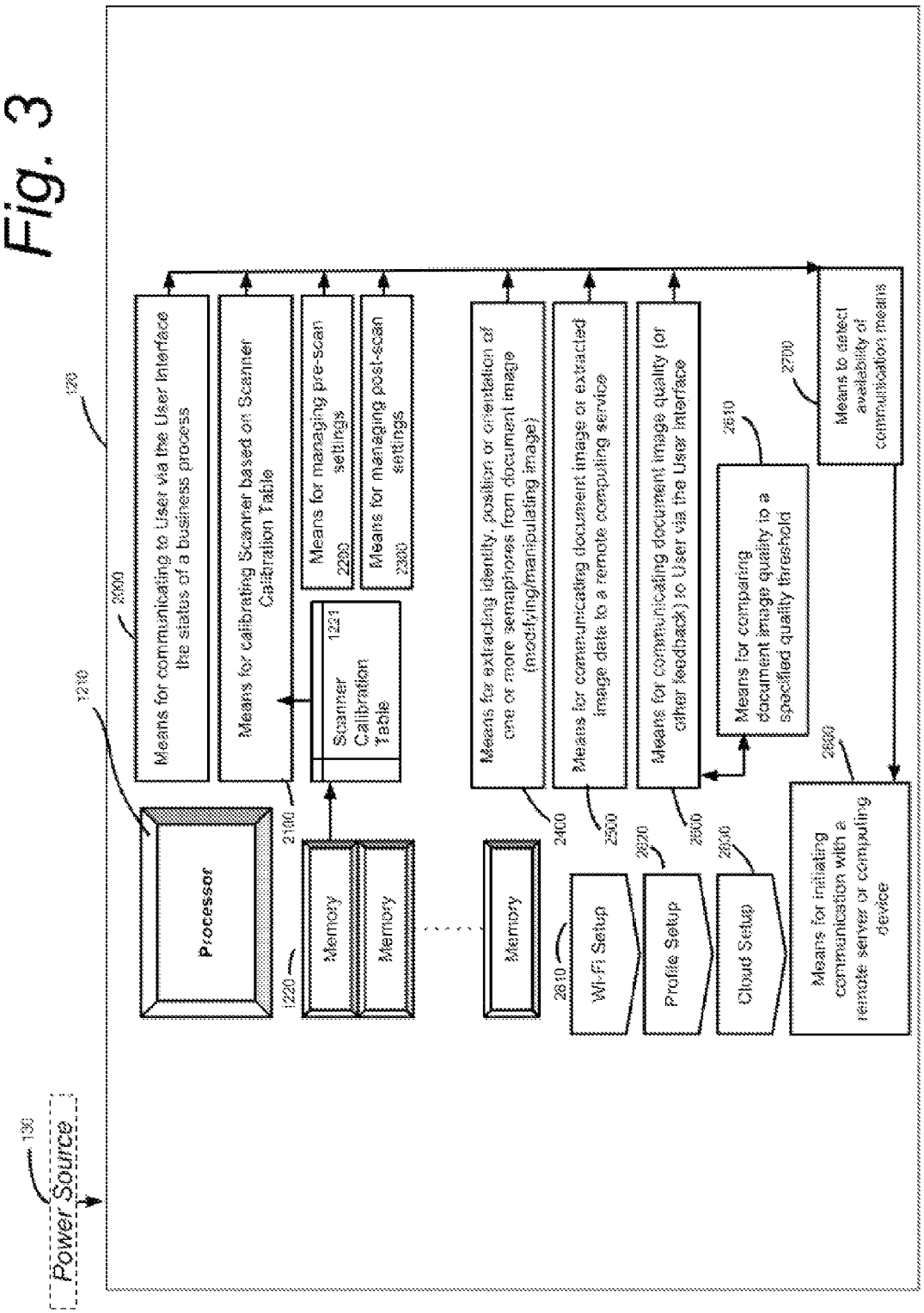
FIG. 3 is a schematic representation of the onboard computer of the portable document scanner in the example embodiment.

As also shown in FIG. 2, the PDS 100 stores in its memory 1220, among various information, a scanner calibration table 1221. By use of the scanner calibration table 1221, the onboard computer 120 may cause the image scanner 102 to be automatically calibrated by invoking the calibrating software 2100, as shown in FIG. 3, which adjusts in-memory settings pertaining to the acquisition of image data by the image scanner 102 and its component parts. In a sample embodiment, the calibrating software 2100 includes stored programming instructions operative when processed to cause the adjustment of parameters such as contrast, brightness and the like by comparison of image data information to expected image data information stored in memory 1220 as part of the scanner calibration table 1221.

FIG. 3 illustrates a more detailed view of the onboard computer 120 and its software components. The onboard computer 120 includes at least a processor 1210 and digital memory 1220 and performs operations at the direction of embedded software or firmware, or in accordance with programming instructions as invoked by actions of the user 1 through the user interface 160 or other identifiable events. As previously described, the onboard computer 120 draws power from the power source 130 of the PDS 100, which is external to the onboard computer 120. The memory 1220 may be flash memory, but one of skill in the art will understand that various other forms of internal or external memory may be substituted.

The onboard computer 120 stores in memory 1220 a scanner calibration table 1221, which provides data input to the processor 1210 and pre-programmed calibration software 2100 to automatically calibrate the image scanner 102 to optimize digital image quality in relation to the original scanned document 2. The onboard computer 120 further stores in memory 1220 pre-programmed instructions 2800 for the handling of user input or event input. As shown in FIG. 3, the user 1 may configure Wi-Fi setup 2810, profile setup 2820, and cloud setup 2830 parameters via the user interface 160. By interacting with the PDS 100 through the user interface 160, the user 1 invokes the pre-programmed instructions 2800 for initiating communication with RCS 200 or some other computing device. In the case of the Wi-Fi setup 2810, this permits the user 1 to cause the PDS 100 to be connected to a wireless network for the purposes of enabling the PDS 100, through the communications port 170, to transmit the scanned image data and other useful data extracted from the scanned images to an RCS 200. Such configuration steps may comprise known Wi-Fi connectivity steps, such as network identification, authorization, and the like. Similarly, the user 1 may configure the profile setup 2820, causing the onboard computer 120 to store in memory 1220 useful information regarding user preferences such as image post-scan processing instructions, connectivity credentials to be used in association with the Wi-Fi setup 2810, and transmission destination information. Also, the cloud setup 2830 allows the user 1 through the user interface 160 to store in memory 1220 information to be used for connectivity, destination selection, authorization and the like for an RCS 200 that is a cloud computing service provider. Further examples of information stored in the cloud setup 2830 process may include document image filing preference instructions, elective server operation preferences, and the like.

The onboard computer 120 further includes software 2200 for managing pre-scan settings. By dialogue with the user 1 through the user input 160, the user 1 is permitted to store profile setup 2820 information as previously described herein. Using certain of that stored information and/or pre-programmed information stored in memory 1220, the software 2200 causes the image scanner 102, upon scanning, to act in accordance with these pre-scan settings. Such settings in example embodiment include, without limitation, input settings such as color mode (e.g., RGB, CMYK, black and white, grayscale, etc.), DPI mode specifying the pixel depth of the digital image generated, image format for digital image storage; and image processing settings such as auto-crop and auto-rotate and the like as described below with respect to FIG. 4.

Likewise, the onboard computer 120 includes software 2300 for managing post-scan settings. Using certain of that information stored in the profile setup 2820, Wi-Fi setup 2810 and cloud setup 2830 as well as other information stored in memory 1220, the software 2300 outputs instructions to the processor 1210 of the onboard computer 120 causing the onboard computer 120 to take output actions, such as generating a copy of the digital image in a specified format or storing the digital image to local memory, or causing the onboard computer 120 to take transmission actions such as conveying the digital image and useful data to RCS 200.

The software 2200 and software 2300 may be implemented in the form of embedded software stored in memory 1220. These functions may be better understood by reference to FIG. 4 as described below.

As illustrated in FIG. 3, the onboard computer 120 further implements software 2400 for extracting identity, position or orientation of one or more semaphores from a document image, permitting the onboard computer 120 to implement image processing in accordance with the instructions of the pre-scan settings. Some possible operations available include the extraction of words, lines or page boundaries, or angle of orientation. These extracted semaphores allow execution of the pre-programmed methods, for example, to auto-rotate an image to de-skew it, such as described in U.S. Pat. No. 8,218,890 "Method and Apparatus for Cropping Images." Other possible pre-programmed methods include modifying the histogram of the image in order to improve image quality, such as described in U.S. Pat. No. 8,155,442 "Method and Apparatus for Modifying the Histogram of an Image" and despeckling the scanned image. In a sample embodiment, software 2400 extracts identity, position, and/or orientation of one or more optical semaphores from the scan image. The extracted semaphores may include (1) optical characters including letters, numerals, and/or punctuation, (2) informational indicia including bar codes, data graphs, pictures, and/or icons, and/or (3) document formatting indicators including lines, bars, arrows, and/or grids. Such extracted semaphore data may then be communicated to a remote computing service via the communications port 170. The software 2400 may further provide semaphore data and/or other data to the onboard computer 120 for input to numerous other onboard operations.

The onboard computer 120 also includes document image quality software 2600 for communicating document image quality to the user 1 via the user interface 160. In the example embodiment, this may be programmatically implemented as stored instructions in the memory 1220 of the onboard computer 120. By invoking instructions for comparing document image quality to a specified quality threshold 2610, the processor 1210 of the onboard computer 120 may determine if the acquired digital image is sufficient in clarity, contrast, brightness, pixel depth, and the like in order to be in accordance with the user's preference or default preference settings for image quality. Having made this determination, the software 2600 causes the processor 1210 to display information to the user 1 via the user interface 160 either indicating successful acquisition of a sufficient quality image or failure to do the same. In one embodiment, the notification to the user may take the form of a dialog through the user interface 160, wherein the user is permitted to elect how to proceed, such as to rescan the document or accept the digital image, despite the onboard computer's 120 determination that the image is of insufficient quality.

FIG. 3 also depicts software 2500 for communicating document image or extracted image data to RCS 200. This function may be programmatically implemented in order to initiate connectivity of the communication port 170 and to cause the port to connect the PDS 100 to RCS 200 via a wired or wireless communication connection 3. The software 2500 is also operable to cause image data and other useful data to be stored in a proper digital format, such as a data packet, in order to be sent through the just-described communication steps. The software 2500 of the example embodiment is also arranged to interact with software 2700 that detects availability of the communication port 170. In the event that connectivity is found by software 2700 to be available, the onboard computer 120 causes the communications to proceed as described. On the other hand, if the software 2700 determines the communication port 170 to be unavailable, the resultant programmatic output instructs the onboard computer 120 to place the PDS 100 into "offline" mode, wherein the onboard computer 120 may store image data for later use or otherwise operate upon the data such as performing further image processing or queuing the image data for future action upon resumption of connectivity.

Finally, the onboard computer 120 further includes software 2000 for communicating to the user via the user interface 160 the status of a business process, permitting the onboard computer 120 to inform the user 1 of the completion, failure, delay, etc. of a business process. Such business process may take various forms, such as combination of acquired digital image data with extracted useful data and geolocation data for communication to RCS 200, automated generation of image-related metadata, logical linking of multiple files related to the image or extracted information such as optical character recognition data or data files, etc. Business processes may be stored in memory 1220 in the form of pre-programmed logical instructions. In an alternative embodiment, additional business processes could be committed to the memory 1220 dynamically in response to user inputs or data process output.

Figure 4:
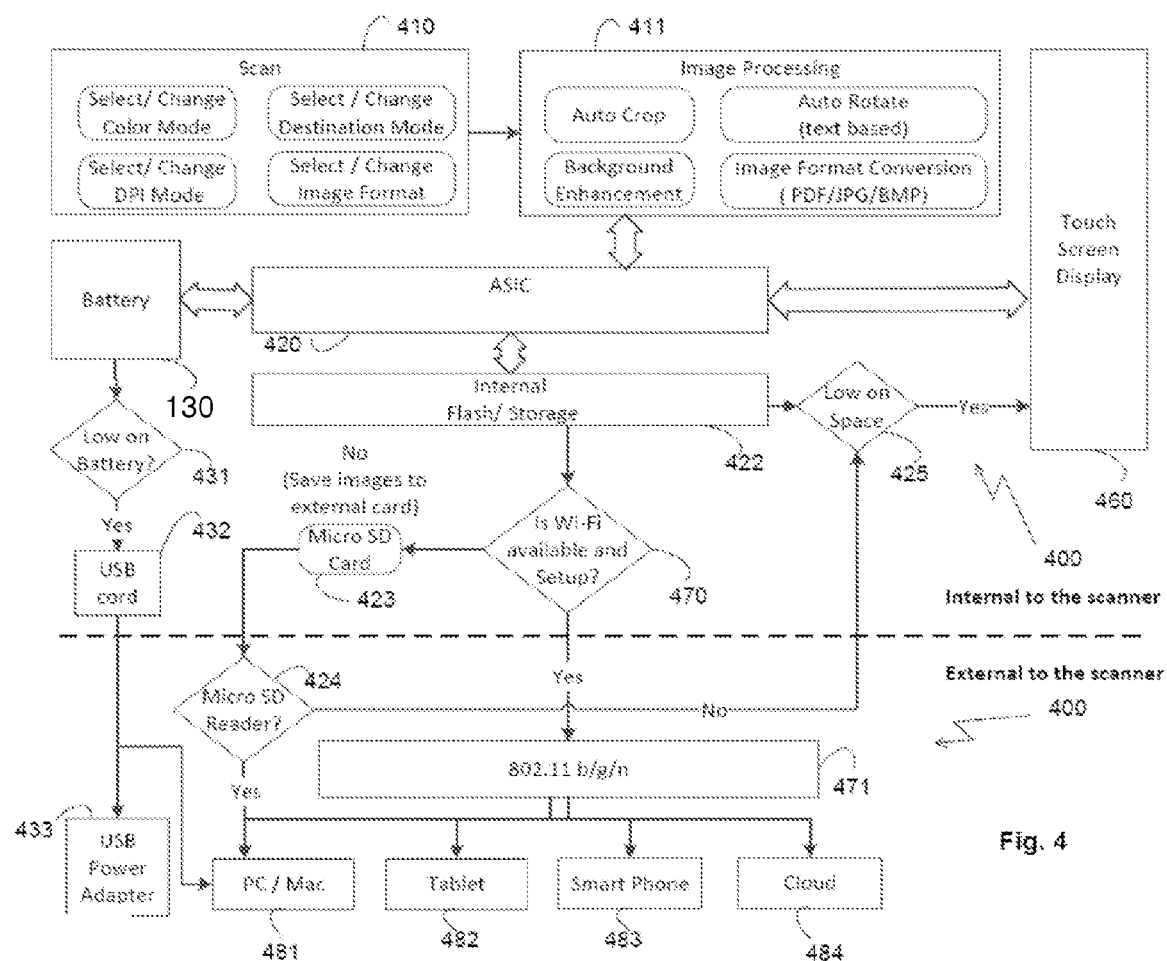
FIG. 4 is a schematic representation of certain components of the portable document scanner and their interaction amongst themselves and with elements external to the portable document scanner during operation.

FIG. 4 is a schematic representation of certain components of the PDS 100 and their interaction amongst themselves and with elements external to the image scanner 102 during operation. FIG. 4 is divided by a dashed line. Above the dashed line are internal components 400, which are physical components or processes found in the housing of the PDS 100. Below the line are external items 401 to which the PDS 100 may be connected directly or indirectly. The onboard computer 120 is here depicted as including an application-specific integrated circuit (ASIC) 420 and a flash memory 422. A wireless process 470 determines whether the PDS 100 can transmit to a wireless receiver, such as an 802.11 gateway 471. If a wireless receiver 471 is not available, the output may optionally be diverted to a micro SD memory card by an internal SD card interface 423. SD cards written by the internal interface 423 can then be read by an external SD card reader 424. An SD reader driver 425 monitors the capacity of the card and notifies the user of low memory conditions via a touch-screen display user interface 460. In FIG. 4, driver 425 is depicted as working with the external reader 424, but the same applies for monitoring a card in interface 423.

The ASIC 420 either manages or interfaces with the scanning processes 410 and imaging processes 411. As indicated, options for scanning may include, for instance: pixel density, i.e., "dots-per-inch" in DPI mode; how color is digitized, i.e., black and white, grey scale, various accuracies of color discrimination in color mode; image storage or export formats, e.g., JPG, TIFF, etc.; and storage or export features in a destination mode.

As also indicated, options for image processing may include, for instance: auto-crop, i.e., digitally determining the useful boundaries of the image; auto-rotate, i.e., reorienting the image digitally to a format more conducive to later analysis, possibly based on heuristic character analysis; background enhancement, e.g., altering the color or relative darkness of the background versus more useful indicia such as writing; and image format conversion, i.e., where the image may be stored in two formats or exported in a format distinct from the internal storage format.

Power for the PDS 100 is stored in a battery 130, which is monitored by power process 431 and recharged via, for example, the depicted USB cord 432 and an external USB power adapter 433. Data from the PDS 100 indirectly reaches other computing devices, such as a personal computer 481, tablet computer 482, smart phone 483, or remote networks or devices 484, preferably indirectly via gateway 471 and, alternatively, via an SD card 423 or card reader 424, USB cord 433, or similar data communications methods.

Thus, the PDS 100 of the invention is operated by a user through integrated user interface 160 to perform a number of local operations. The PDS 100 includes a portable (e.g., handheld) image scanner 102 having an array of semiconductor elements 110 such as CCD devices, photodiodes, or the like arranged on a plane in a linear array, a grid, or the like. In operation, a document presence sensor 150 is configured to trigger operation of the motorized rollers 140 to advance the documents 2 to be scanned relative to the image scanner 102. The scanned images are provided to the onboard computer 120 connected to the image scanner 102 and housed with the image scanner 102 in the housing of PDS 100. The onboard computer 120 includes a digital processor 1210 and a digital memory 1220 including a scanner calibration table 1220 stored therein. User interface 160 is connected to the onboard computer 120 and includes a graphic display and one or more user keys for providing data input. The graphic display may be an LED, LCD, or plasma display or the like, wherein the user keys comprise either user-actuated buttons or designated areas of a touch screen of the graphic display 160. A power source 130 provides electricity to the image scanner 102, onboard computer 120, user interface 160, and motorized roller 140. The power source 130 may include an external power adapter, a battery, and battery charging circuitry.

The PDS 100 further includes a port 170 for communications that is connected to the onboard computer 120. The port 170 comprises either a wired communications port including a connector and a set of circuit components for implementing a USB, Ethernet, or other wired communications protocol, or a wireless communications port including an antenna and a set of circuit components for implementing a Bluetooth, WiFi, Ethernet, or other wireless communications protocol.

In example embodiments, the onboard computer 120 is programmed by stored programming instructions to perform a number of processes automatically and/or under user control including at least the functions illustrated in FIG. 3. Sample instructions include: instructions 2000 for communicating the status of local business processes to the user via the user interface 160, where the business process is based, for example, on one or more of the extracted semaphores or other useful information extracted from the scanned image, and for enabling the user to manage pre-scan settings via instructions 2200 and/or post-scan settings via instructions 2300. The instructions also may include instructions 2100 for calibrating an image from the image scanner 102 using the scanner calibration table 1221; instructions 2400 for extracting an identity, position, or orientation of one or more optical semaphores from the image, the semaphores including, for example, optical characters such as letters, numerals, punctuation; informational indicia such as bar codes, data graphs, pictures, and icons; and document formatting indicators such as lines, bars, arrows, and grids; instructions 2500 for providing remote connectivity for communicating the image, semaphores, or useful data to RCS 200 via the port 170; instructions 2600 for reporting the quality of the image to the user via the user interface 160 according to a quality requirement including, for example, a proportion of the image area from which data is extractable or a percentage of data required by the data requirement; and instructions 2700 and 2800 that initiate communications with RCS 200 when the communications port 170 is determined to be available.

Those skilled in the art will appreciate that other features besides those specifically described herein may be used in a manner consistent with the techniques described herein. For example, the portable image scanner need not be a separate image scanner but may include a scanning application operating on a smart phone or other portable computing device for controlling scanning using a camera of the smartphone or other portable computing device. Such variations are intended to be included within the scope of the invention as defined by the following claims.

What is claimed:

1. A portable document scanner comprising:
   an image scanner for scanning an input document to generate a scan image;
   a processor;
   a wireless communications port that enables wireless communications with remote computing services;
   a user interface adapted to permit a user to select and to interact with software processes being executed by said processor; and
   a memory that stores instructions for execution by the processor, the instructions including instructions that, when processed, cause said processor to (a) extract identity, position, and/or orientation of one or more optical semaphores from the scan image, where the extracted semaphores include (1) optical characters including letters, numerals, and/or punctuation, (2) informational indicia including bar codes, data graphs, pictures, and/or icons, and/or (3) document formatting indicators including lines, bars, arrows, and/or grids, (b) communicate semaphore data to a remote computing service via the wireless communications port, and (c) perform image processing operations on the scan image, said image processing operations including at least one of auto cropping, scaling, rotating to deskew, background enhancement, image format conversion, despeckling, and modifying a histogram of the scan image under user control via said user interface.

2. The portable document scanner of claim 1, further comprising a housing including the image scanner, the processor, the wireless communications port, the user interface, and the memory.

3. The portable document scanner of claim 1, wherein the memory further stores instructions for execution by the processor that, when processed, cause said processor to enable a user to provide via said user interface pre-scan settings including selection of pixel density; how color is digitized, image storage or export formats, and/or storage or export features.

4. The portable document scanner of claim 1, wherein the memory further stores instructions for execution by the processor that, when processed, cause said processor to initiate a business process to be performed by the processor based upon one or more of the extracted semaphore data and to communicate a status of the business process to a user via said user interface.

5. The portable document scanner of claim 1, wherein the memory further stores instructions for execution by the processor that, when processed, cause said processor to determine document image quality and to communicate the document image quality to a user via said user interface.

6. A portable document scanner comprising:
   an image scanner for scanning an input document to generate a scan image;
   a processor;
   a wireless communications port that enables wireless communications with remote computing services; and
   a memory that stores instructions for execution by the processor, the instructions including instructions that, when processed, cause said processor to extract identity, position, and/or orientation of one or more optical semaphores from the scan image, where the extracted semaphores include (1) optical characters including letters, numerals, and/or punctuation, (2) informational indicia including bar codes, data graphs, pictures, and/or icons, and/or (3) document formatting indicators including lines, bars, arrows, and/or grids, and further including instructions that, when processed, cause said processor to communicate semaphore data to a remote computing service via the wireless communications port and to process the scan image to automatically append to the semaphore data further data including geolocation information related to the scan image.

7. A portable document scanner comprising:
   an image scanner for scanning an input document to generate a scan image;
   a processor;
   a wireless communications port that enables wireless communications with remote computing services; and
   a memory that stores instructions for execution by the processor, the instructions including instructions that, when processed, cause said processor to extract identity, position, and/or orientation of one or more optical semaphores from the scan image, where the extracted semaphores include (1) optical characters including letters, numerals, and/or punctuation, (2) informational indicia including bar codes, data graphs, pictures, and/or icons, and/or (3) document formatting indicators including lines, bars, arrows, and/or grids, and further including instructions that, when processed, cause said processor to communicate semaphore data to a remote computing service via the wireless communications port and to detect the availability and connectivity state of the wireless communications port.

8. The portable document scanner of claim 7, wherein the memory further stores instructions for execution by the processor that, when processed, cause said processor to perform image processing of the scan image when the wireless communications port is determined by the processor to be unavailable or disconnected.

9. A method of scanning a document with a portable document scanner, comprising:
- scanning the document with an image scanner to generate a scan image;
- processing the scan image, using a processor, to extract identity, position, and/or orientation of one or more optical semaphores from the scan image, where the extracted semaphores include (1) optical characters including letters, numerals, and/or punctuation, (2) informational indicia including bar codes, data graphs, pictures, and/or icons, and/or (3) document formatting indicators including lines, bars, arrows, and/or grids;
- enabling a user to select and to interact with software processes being executed by said processor via a user interface of the portable document scanner;
- communicating the semaphore data to a remote computing service via a wireless communications port of the portable document scanner, and
- enabling a user to select, via said user interface, image processing operations to be performed on the scan image, said image processing operations including at least one of auto cropping, scaling, rotating to deskew, background enhancement, image format conversion, despeckling, and modifying a histogram of the scan image.

10. The method as in claim 9, further comprising enabling a user to select, via said user interface, pre-scan settings including selection of pixel density; how color is digitized, image storage or export formats, and/or storage or export features.

11. The method as in claim 9, further comprising enabling a user to initiate, via said user interface, a business process to be performed by the processor based upon one or more of the extracted semaphore data, and communicating a status of the business process to the user via said user interface.

12. The method as in claim 9, further comprising determining, using said processor, document image quality, and communicating the document image quality to a user via said user interface.

13. A method of scanning a document with a portable document scanner, comprising:
- scanning the document with an image scanner to generate a scan image;
- processing the scan image, using a processor, to extract identity, position, and/or orientation of one or more optical semaphores from the scan image, where the extracted semaphores include (1) optical characters including letters, numerals, and/or punctuation, (2) informational indicia including bar codes, data graphs, pictures, and/or icons, and/or (3) document formatting indicators including lines, bars, arrows, and/or grids;
- processing the scan image, using said processor, to automatically append to the semaphore data further data including geolocation information related to the scan image; and
- communicating the semaphore data and geolocation information to a remote computing service via a wireless communications port of the portable document scanner.

14. A method of scanning a document with a portable document scanner, comprising:
- scanning the document with an image scanner to generate a scan image;
- processing the scan image, using a processor, to extract identity, position, and/or orientation of one or more optical semaphores from the scan image, where the extracted semaphores include (1) optical characters including letters, numerals, and/or punctuation, (2) informational indicia including bar codes, data graphs, pictures, and/or icons, and/or (3) document formatting indicators including lines, bars, arrows, and/or grids;
- detecting, using said processor, the availability and connectivity state of a wireless communications port of the portable document scanner; and
- communicating the semaphore data to a remote computing service via the wireless communications port of the portable document scanner.

15. The method as in claim 14, further comprising performing image processing of the scan image, using said processor, when the wireless communications port is determined to be unavailable or disconnected.

* * * * *